(12) United States Patent
Oh et al.

(10) Patent No.: US 8,965,466 B2
(45) Date of Patent: Feb. 24, 2015

(54) POUCH AND MOBILE TERMINAL HAVING THE SAME

(71) Applicant: LG Electronics Inc., Seoul (KR)

(72) Inventors: Seokhwan Oh, Incheon (KR); Dongguk Kang, Seoul (KR); Jongbeom Han, Seoul (KR); Zhimin Choo, Anyang (KR); Jongseok Park, Gunpo (KR); Minsoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 13/656,588

(22) Filed: Oct. 19, 2012

(65) Prior Publication Data

US 2013/0102365 A1 Apr. 25, 2013

(30) Foreign Application Priority Data

Oct. 25, 2011 (KR) .......................... 10-2011-0109579

(51) Int. Cl.
  *H04M 1/00* (2006.01)
  *H04M 1/04* (2006.01)
  *H04M 1/02* (2006.01)

(52) U.S. Cl.
  CPC .............. *H04M 1/04* (2013.01); *H04M 1/0241* (2013.01); *H04M 1/0237* (2013.01)
  USPC .................. 455/575.8; 455/575.4; 455/575.1; 361/814

(58) Field of Classification Search
  USPC ............ 455/575.1, 575.3, 575.8, 90.3, 575.4; 361/814
  See application file for complete search history.

(56) References Cited

U.S. PATENT DOCUMENTS

| | | | |
|---|---|---|---|
| 6,920,338 B2 * | 7/2005 | Engstrom et al. .......... | 455/556.1 |
| 7,305,260 B2 * | 12/2007 | Vuori et al. ................ | 455/575.8 |
| 2002/0102866 A1 | 8/2002 | Lubowicki | |
| 2002/0136557 A1 | 9/2002 | Shimamura | |
| 2009/0135555 A1 | 5/2009 | Komine et al. | |
| 2009/0154082 A1 | 6/2009 | Nurmi et al. | |
| 2009/0305755 A1 * | 12/2009 | Lee et al. ................... | 455/575.4 |

OTHER PUBLICATIONS

European Patent Office Application Serial No. 12189489.3, Search Report dated Mar. 27, 2013, 6 pages.

* cited by examiner

*Primary Examiner* — Lewis West

(74) *Attorney, Agent, or Firm* — Lee, Hong, Degerman, Kang & Waimey

(57) ABSTRACT

The present disclosure provides a pouch for a mobile terminal and a mobile terminal having the same. The pouch includes a base defining a space for receiving at least part of a terminal body therein, a slide unit disposed within the base, and relatively slidable with respect to the base along a lengthwise direction of the terminal body, the slide unit supporting the terminal body, an elastic unit disposed between the base and the slide unit to apply an elastic force, a guide unit configured to guide the relative sliding of the slide unit, and a locking unit configured to lock and unlock the slide unit at and from a preset position of the base.

20 Claims, 15 Drawing Sheets

POUCH AND MOBILE TERMINAL HAVING THE SAME

CROSS-REFERENCE TO RELATED APPLICATION

Pursuant to 35 U.S.C. §119(a), this application claims the benefit of earlier filing date and right of priority to Korean Application No. 10-2011-0109579, filed on Oct. 25, 2011, the contents of which is incorporated by reference herein in its entirety.

BACKGROUND OF THE INVENTION

1. Field of the Invention

This specification relates to a pouch and a mobile terminal having a main body capable of being received (accommodated) in the pouch.

2. Background of the Invention

Mobile terminals are electronic devices which are portable and have at least one of voice and telephone call functions, information input and/or output functions, a data storage function and the like.

As it becomes multifunctional, the mobile terminal can be allowed to capture still images or moving images, play music or video files, play games, receive broadcast and the like, so as to be implemented as an integrated multimedia player.

Various attempts have been done for the multimedia device in aspect of hardware or software in order to implement such complicated functions. Among those attempts, improvement of the hardware configuration may be considered.

As the mobile terminals are regarded as personal belongings to express personalities, various design factors are required. Such design factors include structural changes and improvement for making an appearance of the mobile terminal better.

The mobile terminals are affected by external environments, such as moisture, dust, impact and the like during usage. This leads to production of cases, pouches and the like having a function of making the appearance of the mobile terminal more attractive as well as a function of simply protecting the mobile terminal from the external environments. As one example of the structural changes and improvement, a pouch and a mobile terminal having a terminal body capable of being received within the pouch may be regarded.

SUMMARY OF THE INVENTION

Therefore, an aspect of the detailed description is to provide a pouch capable of receiving a terminal body in various states.

Another aspect of the detailed description is to provide a mobile terminal capable of giving various functions to a terminal body or extending conventional functions by use of the pouch.

To achieve these and other advantages and in accordance with the purpose of this specification, as embodied and broadly described herein, there is provided a pouch for a mobile terminal including a base defining a space for receiving at least part of a terminal body therein, a slide unit disposed within the base, and relatively slidable with respect to the base along a lengthwise direction of the terminal body, the slide unit supporting the terminal body, an elastic unit disposed between the base and the slide unit to apply an elastic force, a guide unit configured to guide the relative sliding of the slide unit, and a locking unit configured to lock and unlock the slide unit at and from a preset position of the base.

In accordance with one aspect, the slide unit may be slidable between a first state in which the terminal body is received in the base and a second state in which at least part of the terminal body is exposed.

In accordance with another aspect, the base may include a frame disposed to obscure both side surfaces of the terminal body, and a fixed plate connected to the frame and disposed to obscure a rear surface of the terminal body.

The slide unit may include a moving plate disposed to obscure the rear surface of the terminal body, and relatively slidable with facing the fixed plate, and a support plate extending from the moving plate, and protruding from the moving plate to support the terminal body.

Also, the guide unit may include a first guide rail formed through the fixed plate and extending in one direction, a second guide rail formed through the moving plate and extending in an intersecting direction with the one direction, and a guide member inserted into the first and second guide rails and movable in response to the sliding of the slide unit.

The guide member may include a body inserted into the first and second guide rails, and protruding portions protruding along an outer circumferential surface of the body to obscure the fixed plate and the moving plate, respectively.

Also, the first guide rail may be internally inclined with respect to the sliding direction of the slide unit.

The locking unit may include a first guide rail extending portion extending from the first guide rail in the intersecting direction with the one direction, so as to receive the guide member therein such that the slide unit is fixed to a preset position, and a manipulation portion mounted onto the fixed plate to press the guide member to be placed on the first guide rail.

The manipulation portion may be disposed adjacent to the first guide rail extending portion, and formed to be movable in one direction so as to press the guide member.

The elastic unit may include a first elastic member configured to apply an elastic force to the slide unit in the sliding direction of the slide unit, and a second elastic member configured to apply an elastic force to the guide member in the intersecting direction with the sliding direction such that the guide member is received in the first guide rail extending portion.

Also, the second elastic member may be a spring having one end fixed to the moving plate and the other end fixed to the guide member.

To achieve the above aspects, there is provided a mobile terminal including a terminal body having a display unit on a front surface and configured to perform a wireless communication function, and the above pouch for the mobile terminal, the pouch configured to receive the terminal body therein and having an opening for exposing at least part of the display unit.

The terminal body may include a first connection port, and the first connection port may be electrically connected to a second connection port mounted onto a bottom surface of the base.

The display unit may be configured to output visual information of a first mode in a state that the terminal body is separated from the pouch for the mobile terminal, while outputting visual information of a second mode when the first connection port and the second connection port are electrically connected to each other.

The terminal body may further include a proximity sensor disposed to overlap the pouch for the mobile terminal in the first state, and configured to sense whether or not an external object is proximate. The display unit may output visual information of a pouch mode when the proximity sensor senses the proximity of the external object, and output visual information of a half pouch mode when the proximity sensor has not sensed the proximity of the external object.

The display unit may be configured to output a main menu in the pouch mode, and to output sub menus of the main menu in the half pouch mode.

First and second cameras may be mounted onto a rear surface and a front surface of the terminal body, respectively. The terminal body may be converted into an operating mode of the second camera, upon conversion into the second state, while operating in an operating mode of the first camera in the first state.

The terminal body may be converted into an operating mode of a speakerphone upon conversion into the second state while operating in a phone call mode in the first state.

In accordance with another aspect, the terminal body may include a main antenna configured to transmit and receive a wireless signal, and the pouch for the mobile terminal may include sub antennas installed therein to extend the wireless communication function of the terminal body.

The sub antennas may be disposed adjacent to the main antenna with preset intervals so as to form coupling with the main antenna.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of a pouch and a mobile terminal having the same according to the exemplary embodiments, with reference to the accompanying drawings.

For the sake of brief description with reference to the drawings, the same or equivalent components will be provided with the same reference numbers, and description thereof will not be repeated. The expression in the singular form in this specification will cover the expression in the plural form unless otherwise indicated obviously from the context.

Hereinafter, suffixes "module" and "unit or portion" for components used herein in description are merely provided only for facilitation of preparing this specification, and thus they are not granted a specific meaning or function.

Mobile terminals described in this specification may include cellular phones, smart phones, laptop computers, digital broadcasting terminals, personal digital assistants (PDAs), portable multimedia players (PMPs), E-books, navigators, and the like.

Figure 1:
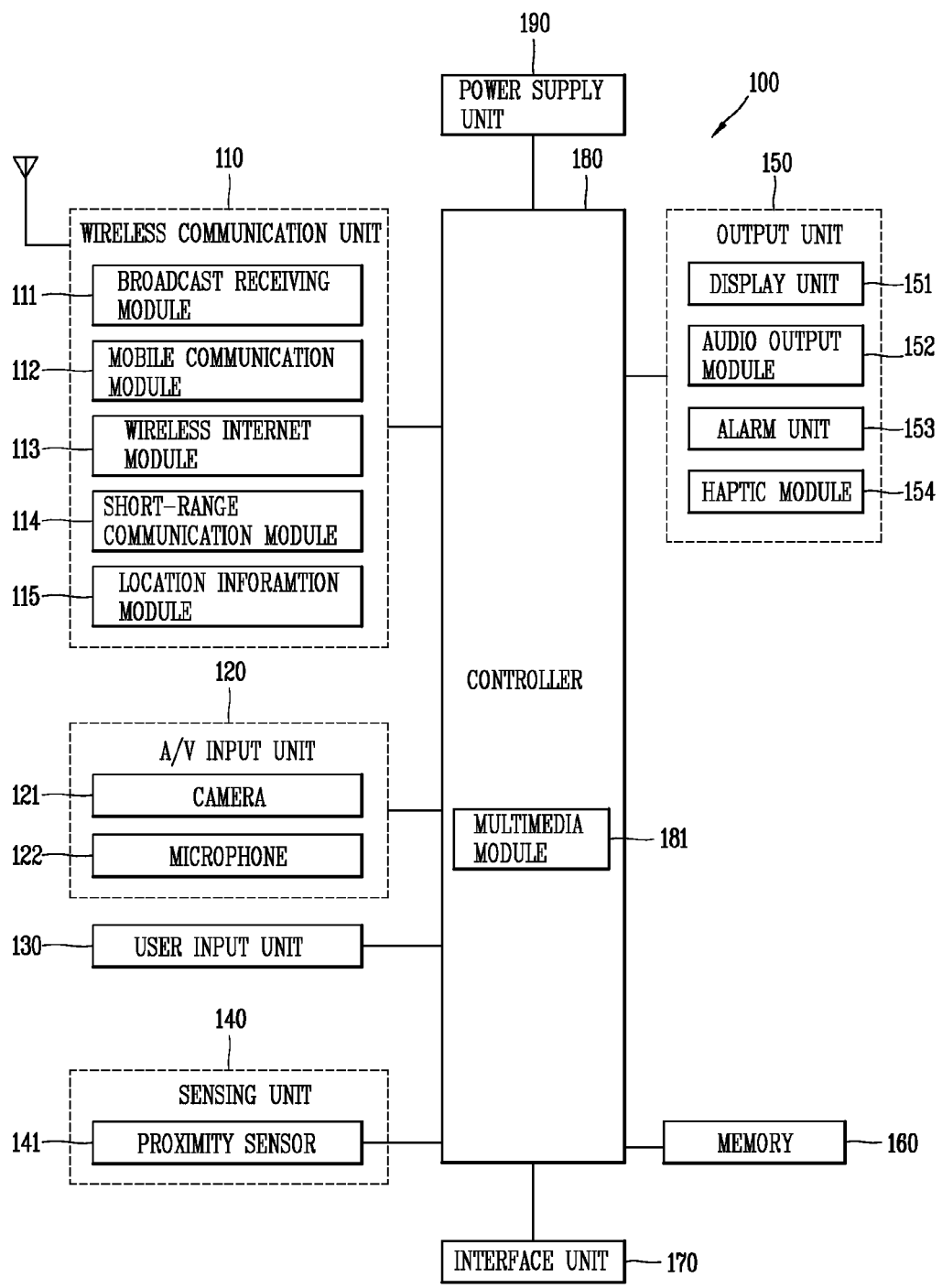
FIG. 1 is a block diagram of a mobile terminal in accordance with one exemplary embodiment.

FIG. 1 is a block diagram of a mobile terminal 10 in accordance with one exemplary embodiment.

The mobile terminal 10 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 10 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 10 and a wireless communication system or between the mobile terminal 10 and a network within which the mobile terminal 10 is located. For example, the wireless communication unit 110 may include a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless Internet module 113 supports wireless Internet access for the mobile terminal. This module may be internally or externally coupled to the mobile terminal 10. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 10, a presence or absence of user contact with the mobile terminal 10, the location of the mobile terminal 10, acceleration/deceleration of the mobile terminal 10, and the like, so as to generate a sensing signal for controlling the operation of the mobile terminal 10. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Meanwhile, the sensing unit 140 may include a proximity sensor 141.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 10. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 10. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 10 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 10, e.g., sound alarming a call received or a message received, and so on. The audio output module 152 may include a receiver, a speaker, a buzzer, and so on.

The alarm unit 153 outputs signals notifying occurrence of events from the mobile terminal 10. The events occurring from the mobile terminal 10 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 10.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 10 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 10, or a data transmission from the mobile terminal 10 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 10, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 10 via a port.

Also, the interface unit 170 may serve as a path for power to be supplied from an external cradle to the mobile terminal 10 when the mobile terminal 10 is connected to the external cradle or as a path for transferring various command signals input from the cradle by a user to the mobile terminal 10. Such various command signals or power input from the cradle may operate as signals for recognizing that the mobile terminal 10 has accurately been mounted to the cradle.

The controller 180 typically controls the overall operations of the mobile terminal 10. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
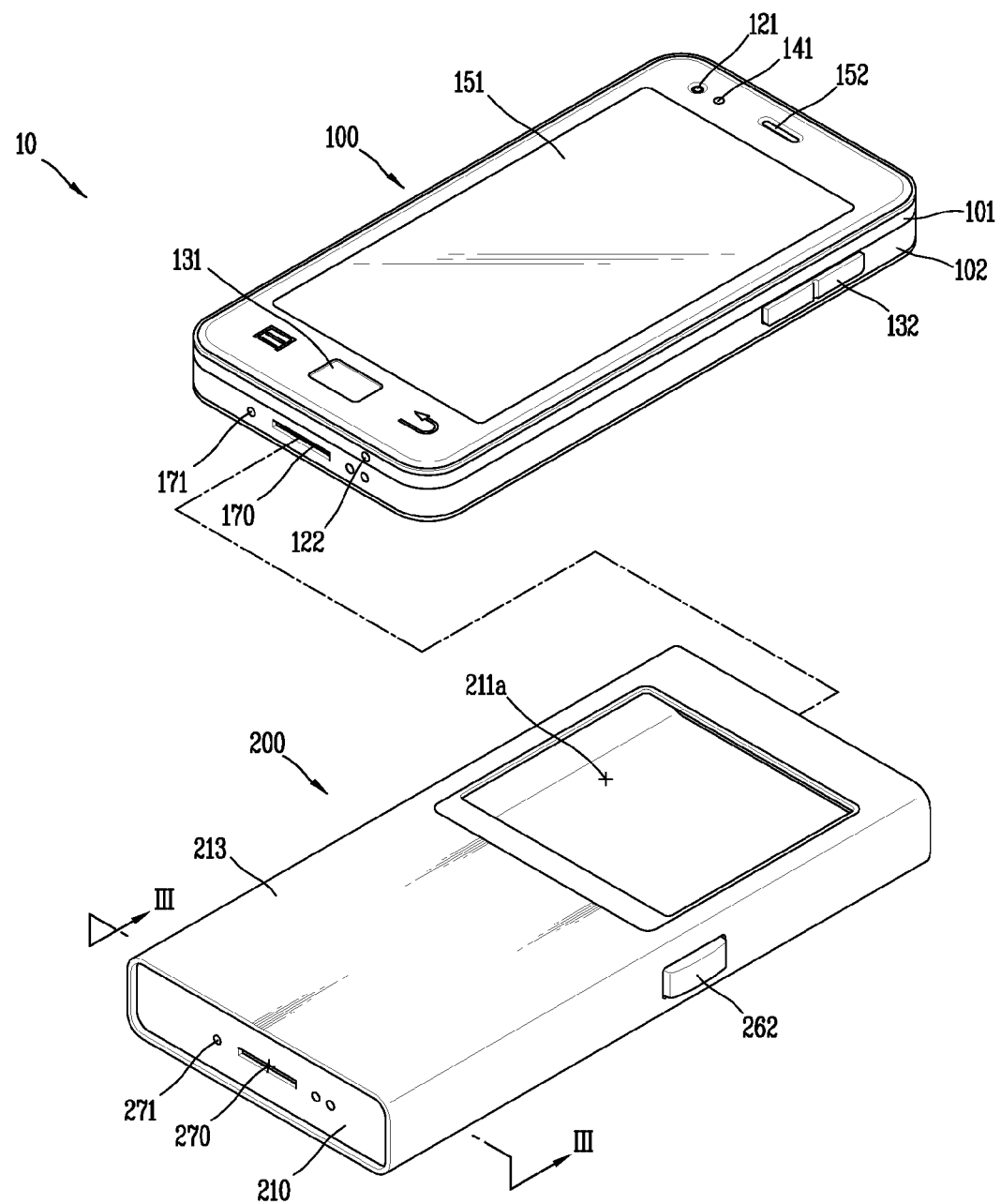
FIG. 2A illustrates one example of the mobile terminal according to this specification, which is a front perspective view showing a separated state of a terminal body from a pouch.

FIG. 2A illustrates one example of the mobile terminal 10 according to this specification, which is a front perspective view showing a separated state of a terminal body 100 from a pouch 200.

The mobile terminal 10 may include a terminal body 100 and a pouch 200 for receiving (accommodating) the terminal body 100 therein. The terminal body 100 may perform a wireless communication function and be configured to be received in or separated from the pouch 200. The pouch 200 may serve to protect the mobile terminal 10 from external environments and give attraction to the mobile terminal 10. The pouch 200 may include an opening 211a corresponding to the display unit 151 such that the display unit 151 can be partially exposed when the terminal body 100 is received in the pouch 200. A detailed structure of the pouch 200 will be explained later with reference to FIG. 3.

The mobile terminal 10 includes a bar type terminal body 100. However, this detailed description may be applicable, but not limited to, a various structures, such as a slide type, a folder type, a swing type, a swivel type and the like, having two or more bodies coupled to be relatively movable with each other.

A body may include a case (or referred to as casing, housing, cover, etc.) defining an appearance of the mobile terminal 10. In this exemplary embodiment, the case may be divided into a front case 101 and a rear case 102. A space formed between the front and rear cases 101 and 102 may accommodate various electronic components. At least one intermediate case may further be disposed between the front and the rear cases 101 and 102.

Such cases may be injected using a synthetic resin or be formed of a metal, such as stainless steel (STS), titanium (Ti) or the like.

The terminal body is shown having a display unit 151, an audio output module 152, a camera 121, a user input unit 130/131, 132, a microphone 122, an interface unit 170, and the like.

The display unit 151 may occupy most of a principal surface of the front case 101. The audio output module 152 and the camera 121 may be disposed near one of both end portions of the display unit 151, and the user input unit 131 and the microphone 122 on the other end portion of the display unit 151. The user input unit 132, the interface unit 170 and the like may be disposed on side surfaces of the front and rear cases 101 and 102.

The user input unit 130 may be manipulated to allow inputting of commands for controlling operations of the mobile terminal 10, and include a plurality of first manipulation units 131, 132. The plurality of manipulation units 131, 132 may be referred to as a manipulating portion. Such manipulating portion can employ any tactile manner that a user can touch or tap for manipulation.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display unit 151 into a touch recognition mode, or the like.

Figure 2B:
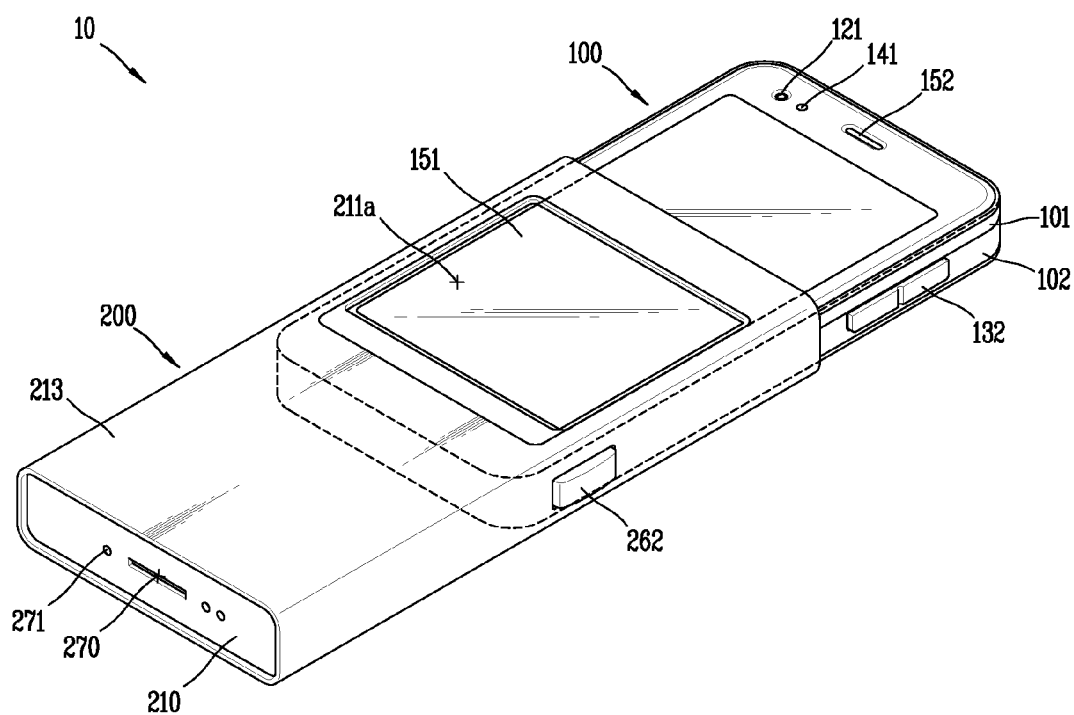
FIG. 2B is a perspective view showing a received state of the terminal body shown in FIG. 2A in the pouch (i.e., a half pouch state)

FIG. 2B is a perspective view showing a received state of the terminal body 100 shown in FIG. 2A in the pouch 200 (i.e., a half pouch state).

The terminal body 100 may be completely received in the pouch 200 (i.e., a pouch state, first state) or partially exposed according to an operating mechanism of the pouch 200 (i.e., a half pouch state, second state).

The terminal body 100 may perform a specific function according to the received state in the pouch 200, and achieve a more extended function using the pouch 200. It may also be natural that the terminal body 100 can independently operate with being completely separated from the pouch 200.

Figure 2C:
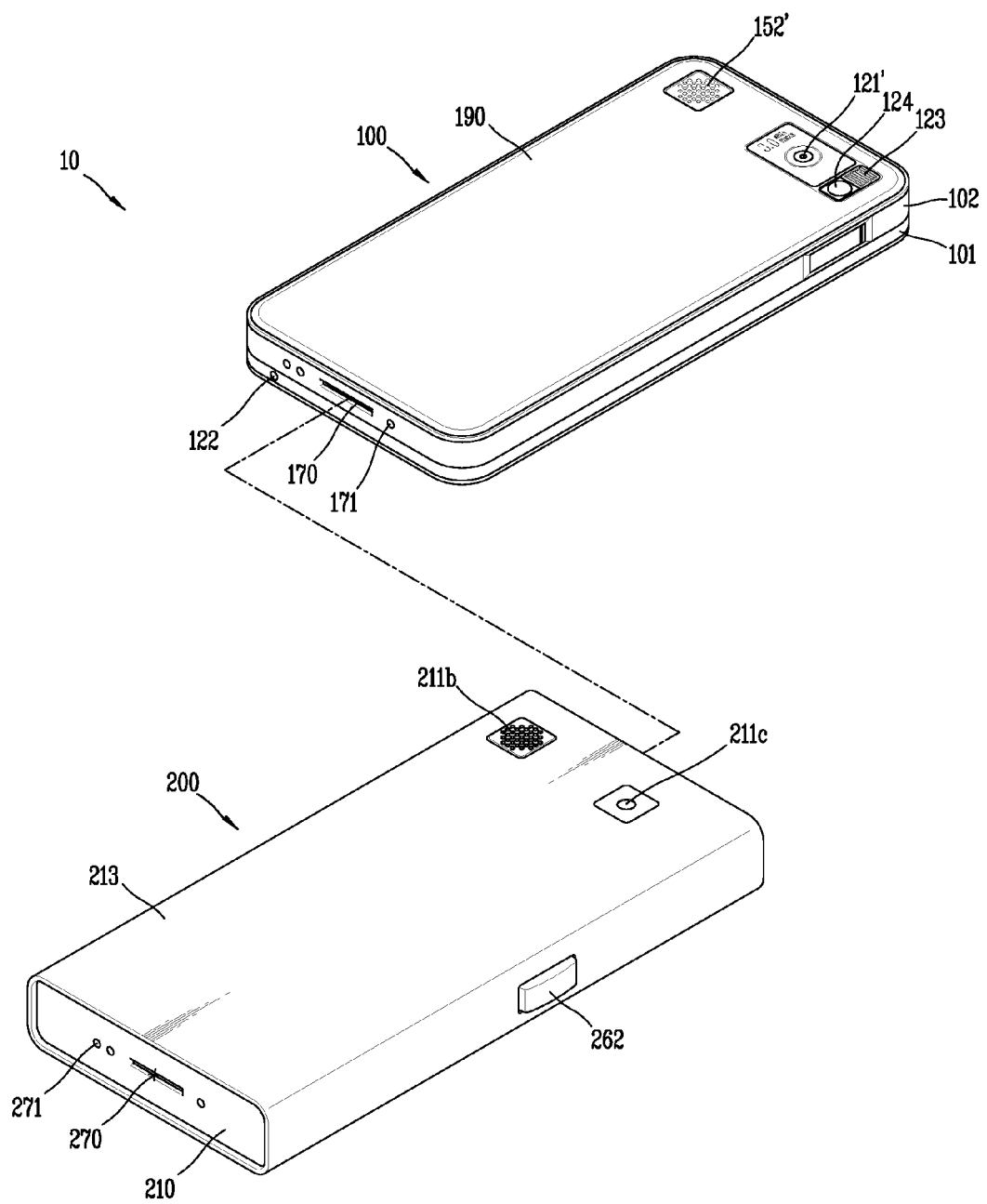
FIG. 2C is a rear perspective view showing the separated state of the terminal body shown in FIG. 2A from the pouch.

FIG. 2C is a rear perspective view showing the separated state of the terminal body 100 shown in FIG. 2A from the pouch 200.

Referring to FIG. 2C, a rear face of the terminal body, namely, the rear case 102 may further be provided with a camera 121'. The camera 121' faces a direction which is opposite to a direction faced by the camera 121 (see FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode. An audio output module 152' may further be disposed at a rear face of the terminal body. The audio output module 152' can cooperate with the audio output module 152 (see FIG. 2A) to provide stereo output. Also, the audio output module 152' may be configured to operate as a speakerphone.

A broadcast signal receiving antenna (not shown) may further be disposed at one side of the terminal body in addition to an antenna for communications, for example. The antenna 124 configuring a part of the broadcast receiving module 111 (see FIG. 1) may be retractable into the terminal body.

A power supply unit 190 for supplying power to the mobile terminal 10 may be mounted in the terminal body. The power supply unit 190 may be mounted in the terminal body 100 or detachably coupled directly onto the outside of the terminal body 100.

Figure 3:
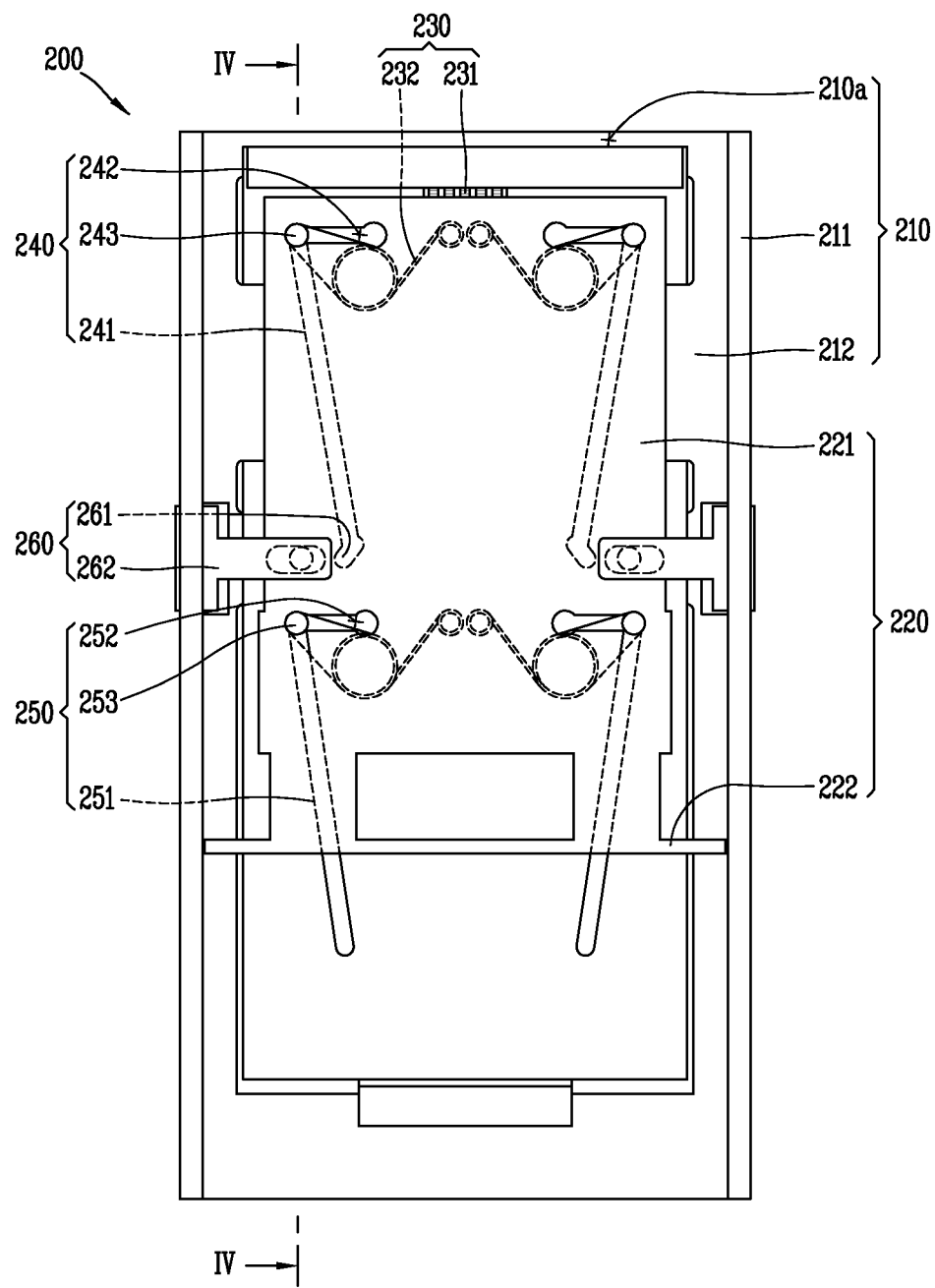
FIG. 3 is a front conceptual view of the pouch, taken along the line III-III of FIG. 2A.
Figure 4:
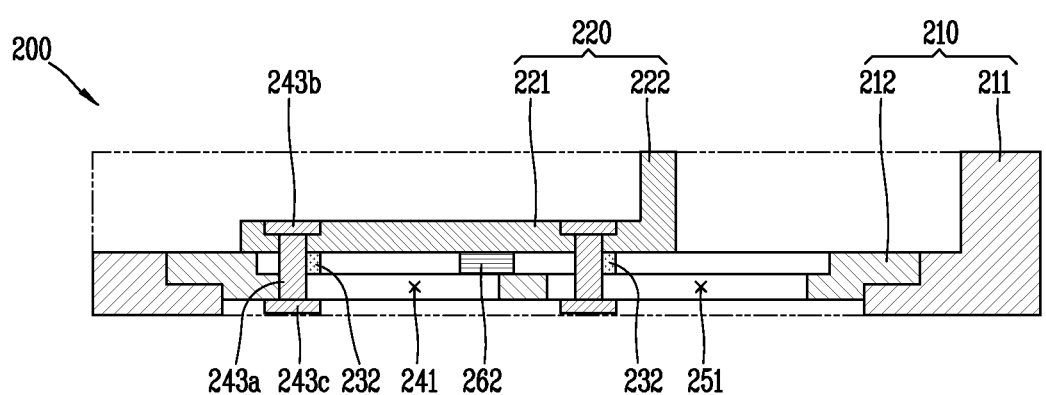
FIG. 4 is a sectional view taken along the line IV-IV of FIG. 3.

FIG. 3 is a front conceptual view of the pouch, taken along the line III-III of FIG. 2A, and FIG. 4 is a sectional view taken along the line IV-IV of FIG. 3.

As shown in FIGS. 3 and 4, the pouch 200 may have a structure of receiving (accommodating) the terminal body 100 in a pouch state and in a half pouch state, and converting one state into another state according to a manipulation. The pouch 200 may include a base 210, a slide unit 220, an elastic unit 230, a guide unit 240, and a locking unit 260.

The base 210 may form a space for receiving at least part of the terminal body 100. The base 210 may include an opening 210a for allowing the terminal body 100 to be inserted thereinto in one direction. This exemplary embodiment illustrates that the opening 210a is formed at an upper end of the base 210 such that the terminal body 100 can be inserted in a lengthwise direction.

The base 210 may also include a frame 211 and a fixed plate 212. The frame 211 may cover both side surfaces of the terminal body 100, and include an opening 211a (see FIG. 2A), which is formed at a front surface thereof and corresponds to the display unit 151 to expose at least part of the display unit 151. The fixed plate 212 may be connected to the frame 211 and cover a rear surface of the terminal body 100. The frame 211 and the fixed plate 212 may be integrally formed with each other.

The base 210 may also include a cover 213 (see FIG. 2A) defining an appearance thereof. The cover 213 may shield the frame 211 and the fixed plate 212, and obtain esthetic appreciation through surface processing. The cover 213 may be formed of leather or synthetic resin, or of a metal such as stainless steel (STS), aluminum (Al), titanium (Ti) or the like.

The slide unit 220 may be disposed within the base 210. The slide unit 220 may support the terminal body 100, and be coupled to be relatively slidable with respect to the base 210 in a lengthwise direction of the terminal body 100.

In detail, the slide unit 220 may include a moving plate 221, and a support plate 222. The moving plate 221 may shield a rear surface of the terminal body 100, and be relatively slidable with facing the fixed plate 212. The support plate 222 may extend from the moving plate 221, and protrude from the moving plate 221 to support the terminal body 100. The moving plate 221 and the support plate 222 may be integrally formed with each other.

The guide unit 240 may be configured to guide relative sliding of the slide unit 220 with respect to the base 210. The guide unit 240 may include a first guide rail 241, a second guide rail 242, and a guide member 243.

The first guide rail 241 may penetrate through the fixed plate 212, and extend in one direction. The first guide rail 241 may extend in a relative sliding direction of the slide unit 220, namely, in the lengthwise direction of the terminal body 100, or formed to be internally or externally inclined from the relative sliding direction.

The second guide rail 242 may penetrate through the moving plate 221, and extend along an intersecting direction with the one direction. This exemplary embodiment illustrates that the first guide rail 241 is internally inclined from the relative sliding direction and the second guide rail 242 extends toward the inside.

The first and second guide rails 241 and 242 may be disposed such that at least parts thereof overlap each other. The guide member 243 may be inserted into the overlapped portion. The guide member 243 may be movable in response to the sliding of the slide unit 220. In detail, when the slide unit 220 is slid by an external force in one direction, the guide member 243 which is brought into contact with the slide unit 220 moves along the first guide rail 241. The slide unit 220 may accordingly be slid along a preset path.

The guide member 243 may have a structure of prevented from being separated from the first and second guide rails 241 and 242. For example, the guide member 243 may include a body 243a, and protruding portions 243b and 243c to shield both ends of the body 243a. The body 243a may be inserted into the first and second guide rails 241 and 242. The protruding portions 243b and 243c may protrude along an outer circumferential surface of the body 243a, and obscure the fixed plate 212 and the moving plate 221, respectively.

At least one guide unit 240 may be provided at at least one side of the pouch 200. As shown, the guide unit 240 may be disposed adjacent to both sides of the pouch 200. For more stable operations, a guide unit 250 having the same shape as the guide unit 240 may further be disposed.

The locking unit 260 may be configured to lock or unlock the slide unit 220 at or from a preset position of the base 210. The locking unit 260 may include a first guide rail extending portion 261 and a manipulation portion 262.

The first guide rail extending portion 261 may extend from the first guide rail 241 along a direction intersecting with the one direction. As shown in the drawings, the first guide rail extending portion 261 may externally extend with respect to the relative sliding direction. The guide member 243 may be accommodated in the first guide rail extending portion 261 to fix the slide unit 220 to a preset position.

The manipulation portion 262 may be formed at the fixed plate 212 to be pressed in one direction. As one end of the manipulation portion 262 pushes the guide member 243 by being pressed, the guide member 243 may be disposed on the first guide rail 241. In detail, the manipulation portion 262 may be disposed adjacent to the first guide rail extending portion 261, and mounted to be movable in one direction so as to press the guide member 243.

The manipulation portion 262 may include a through hole 263 for insertion of a pin 265 therein, and the fixed plate 212 may include a hole 264 extending in one direction such that the pin 265 is movably inserted therein. The one direction may be a direction toward the first guide rail extending portion 261. One end of the manipulation portion 262 may be disposed to overlap the first guide rail extending portion 261, thus being pushed away by the guide member 243 when the guide member 243 is inserted into the first guide rail extending portion 261. The pin 265 may have the same shape as that of the guide member 243.

The elastic unit 230 may be disposed between the base 210 and the slide unit 220 to apply an elastic force. The elastic unit 230 may include a first elastic member 231 and a second elastic member 232.

The first elastic member 231 may apply the elastic force to the slide unit 220 in a sliding direction of the slide unit 220. The first elastic member 231 may be disposed adjacent to a central axis of the pouch 200 to prevent the elastic force from being concentrated onto one side. Both ends of the first elastic member 231 may be fixed to the fixed plate 212 and the moving plate 221, respectively.

The second elastic member 232 may apply the elastic force to the guide member 243 in a direction intersecting with the sliding direction such that the guide member 243 can be received in the first guide rail extending portion 261. The second elastic member 232 may be implemented as a spring whose one end is fixed to the moving plate 221 and the other end is fixed to the guide member 243.

Figure 5A:
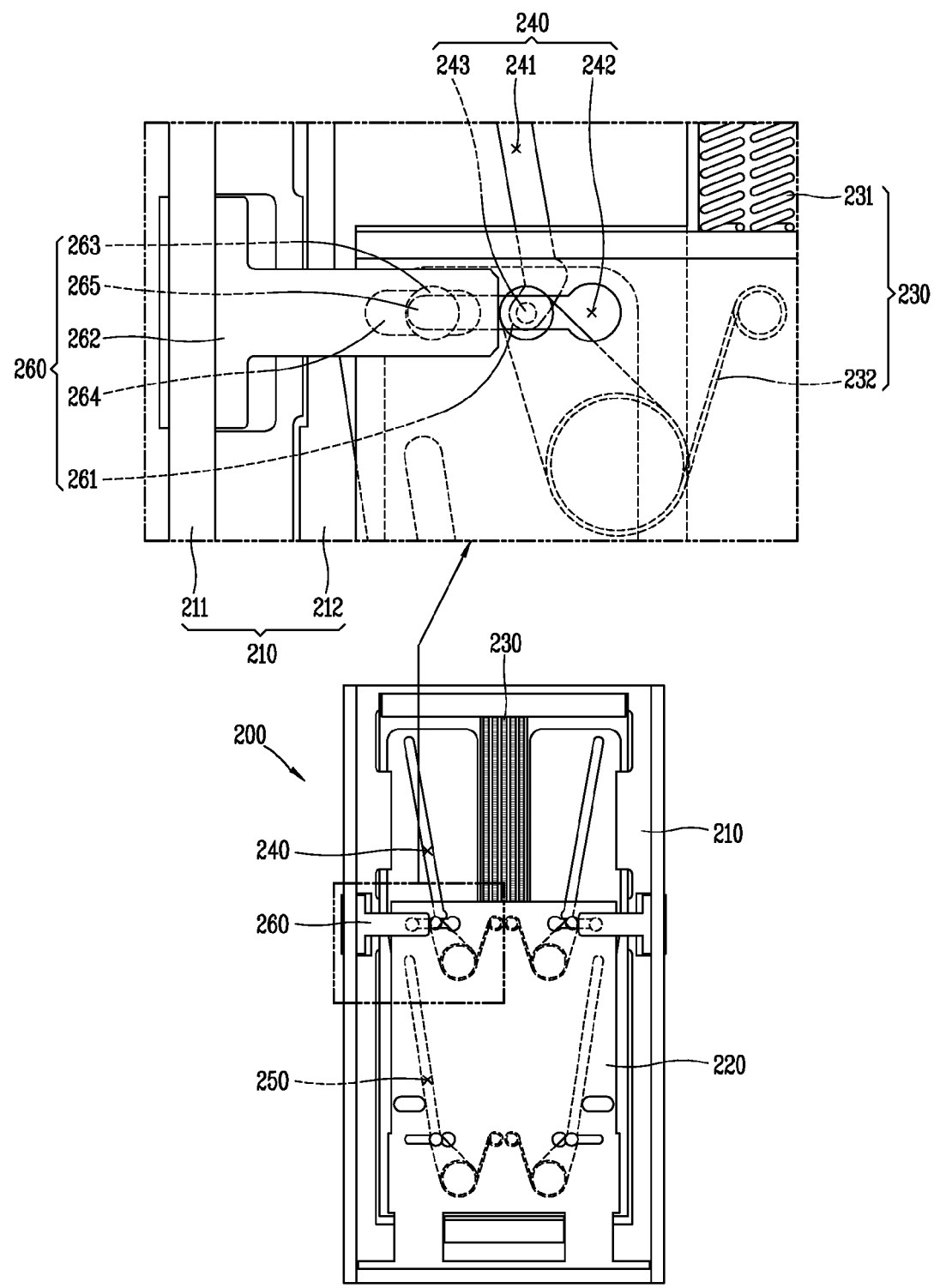
FIGS. 5A and 5B are conceptual views showing an operating mechanism of the pouch shown in FIG. 3.
Figure 5B:
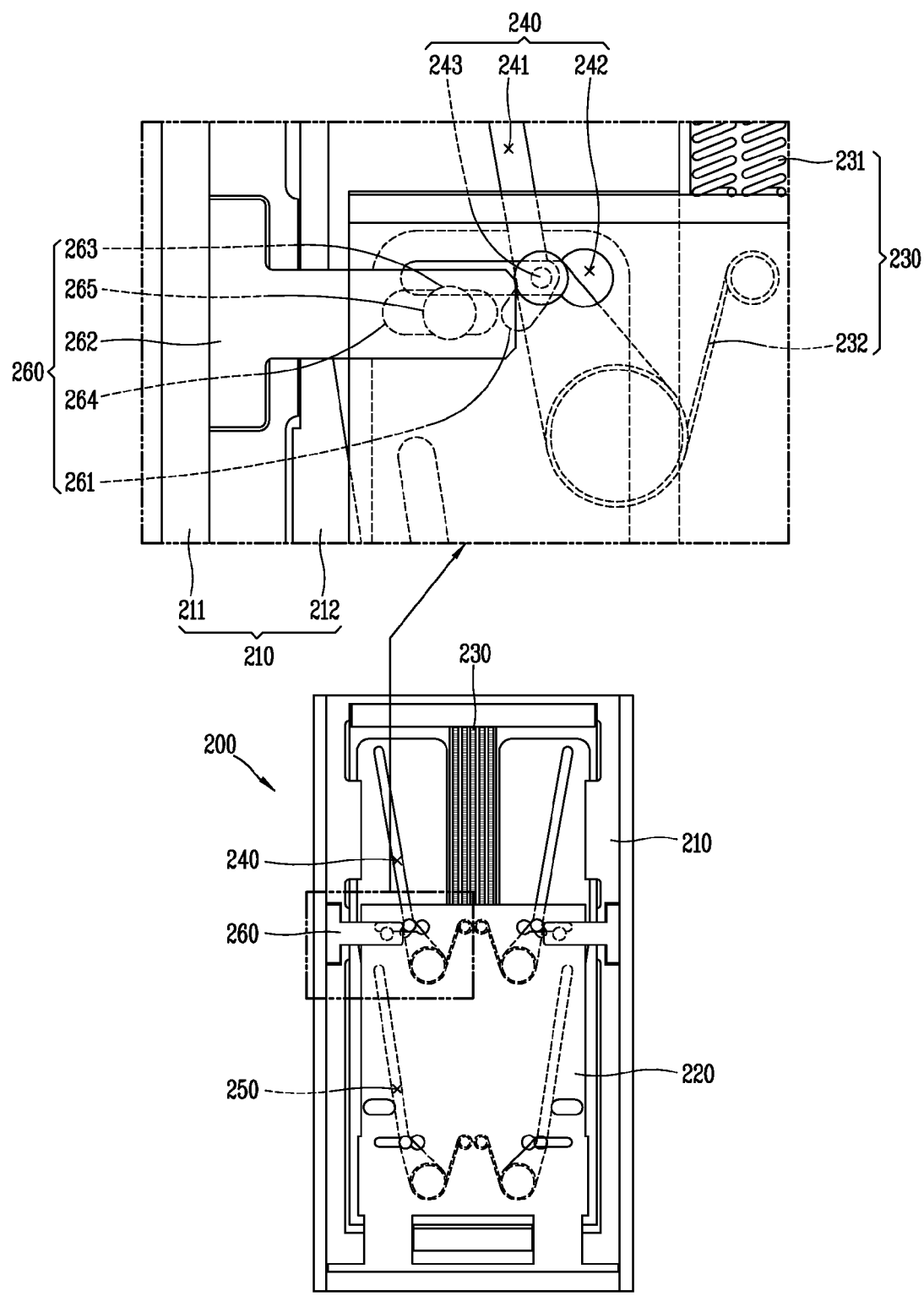

FIGS. 5A and 5B are conceptual views showing an operating mechanism of the pouch 200 shown in FIG. 3. The drawings omit the terminal body 100 for the sake of explanation, but it may be understood that the terminal body 100 is supported by the support plate 222. FIG. 3 shows the half pouch state that the terminal body 100 is partially inserted, and FIGS. 5A and 5B show the pouch state that the terminal body 100 is completely inserted, namely, locked and unlocked states.

The slide unit 220 may be slidable between a first state (pouch state) that the terminal body 100 is received in the base 210 and a second state (half pouch state) that at least part of the terminal body 100 is exposed.

Referring to FIG. 3, the slide unit 220 may be located adjacent to an upper end of the base 210 by the first elastic member 231. The guide member 243 may receive the elastic force from the second elastic member 232 applied to the outside of the pouch 200. The support plate 222 may be disposed adjacent to a middle portion of the pouch 200, and the terminal body 100 may be in the half pouch state that at least part of the terminal body 100 is exposed when the terminal body 100 is inserted.

Referring to FIGS. 5A and 5B, the slide unit 220 may be relatively slid on one surface of the base 210 in response to an external force (i.e., a force that the terminal body 100 presses the support plate 222). The guide member 243 may guide sliding of the slide unit 220 while moving along the first and second guide rails 241 and 242. When the first guide rail 241 is formed to be inclined with respect to the sliding direction, the guide member 243 may move in a contact state with a surface forming the first guide rail 241. Consequently, the slide unit 220 may be slidable at an appropriate speed, and be free from an impact upon a conversion into the half pouch state.

The guide member 243 is receiving the elastic force applied toward the outside by the second elastic member 232. Accordingly, when the guide member 243 reaches the first guide rail extending portion 261, it may be received in the first guide rail extending portion 261 so as to fix the slide unit 220 to a preset position. One end of the manipulation portion 262 may overlap the first guide rail extending portion 261, and accordingly be pushed away by the guide member 243 when the guide member 243 is inserted into the first guide rail extending portion 261. FIG. 5A shows a state that the manipulation portion 262 has protruded from the frame 211 due to being pressed by the guide member 243.

When the manipulation portion 262 is pressed in the locked state, the manipulation portion 262 presses the guide member 243. The guide member 243 is then pushed away from the first guide rail extending portion 261 to be placed on the first guide rail 241. As the locked state is released, the slide unit 220 is slid toward the upper end of the base 210 by an elastic restoring force of the first elastic member 231.

The slide unit 220 may be relatively slid with respect to the base 210 by the mechanism, and the terminal body 100 may be received in the pouch 200 in the pouch state and in the half pouch state.

Figure 6:
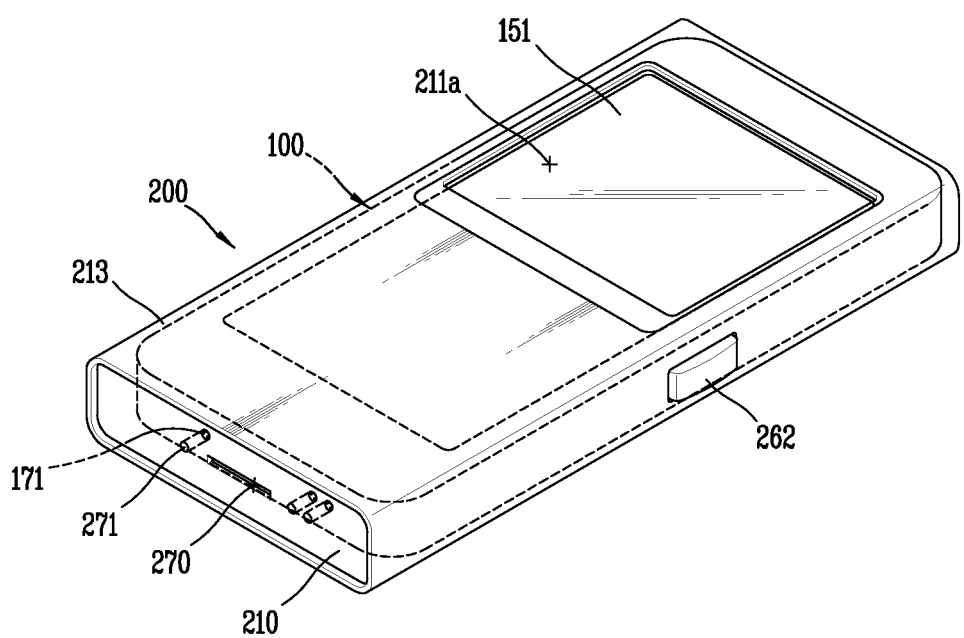
FIG. 6 is a conceptual view showing connection ports for electrically connecting the terminal body to the pouch shown in FIG. 2A.

FIG. 6 is a conceptual view showing connection ports for electrical connection between the terminal body 100 and the pouch 200 shown in FIG. 2A.

The terminal body 100 may include a first connection port 171 and the pouch 200 may include a second connection port 271 for electrical connection to the first connection port 171. The second connection port 271 may include a plurality of terminals. The plurality of terminals may include an anode (+) terminal, a cathode (−) terminal, and a ground terminal.

Referring to FIG. 6, a plurality of terminals configuring the first connection port 171 may be disposed at a lower portion of the terminal body 100. The plurality of terminals may receive power supplied from the exterior. The second connection port 271 may be mounted onto a bottom surface of the base 210 or onto the support plate 222, and contactable with the terminal body 100 when the terminal body 100 is inserted. The second connection port 271 may elastically press the first connection port 171 to maintain the contact state with the first connection port 171 upon an external impact being applied.

The second connection port 271 may be externally exposed so as to contact a terminal of an external device (for example, a cradle, a docking station, etc.). The terminal body 100 may be electrically connected to the external device so as to receive power supply or transmit or receive data.

When the first connection port 171 is electrically connected to the second connection port 271, the controller 180 of the terminal body 100 may sense the electrical connection so as to perform a specific function. For example, the display unit 151 may output visual information of a first mode in a state that the terminal body 100 is separated from the pouch 200, and output visual information of a second mode when the first connection port 171 is electrically connected to the second connection port 271.

Figure 7:
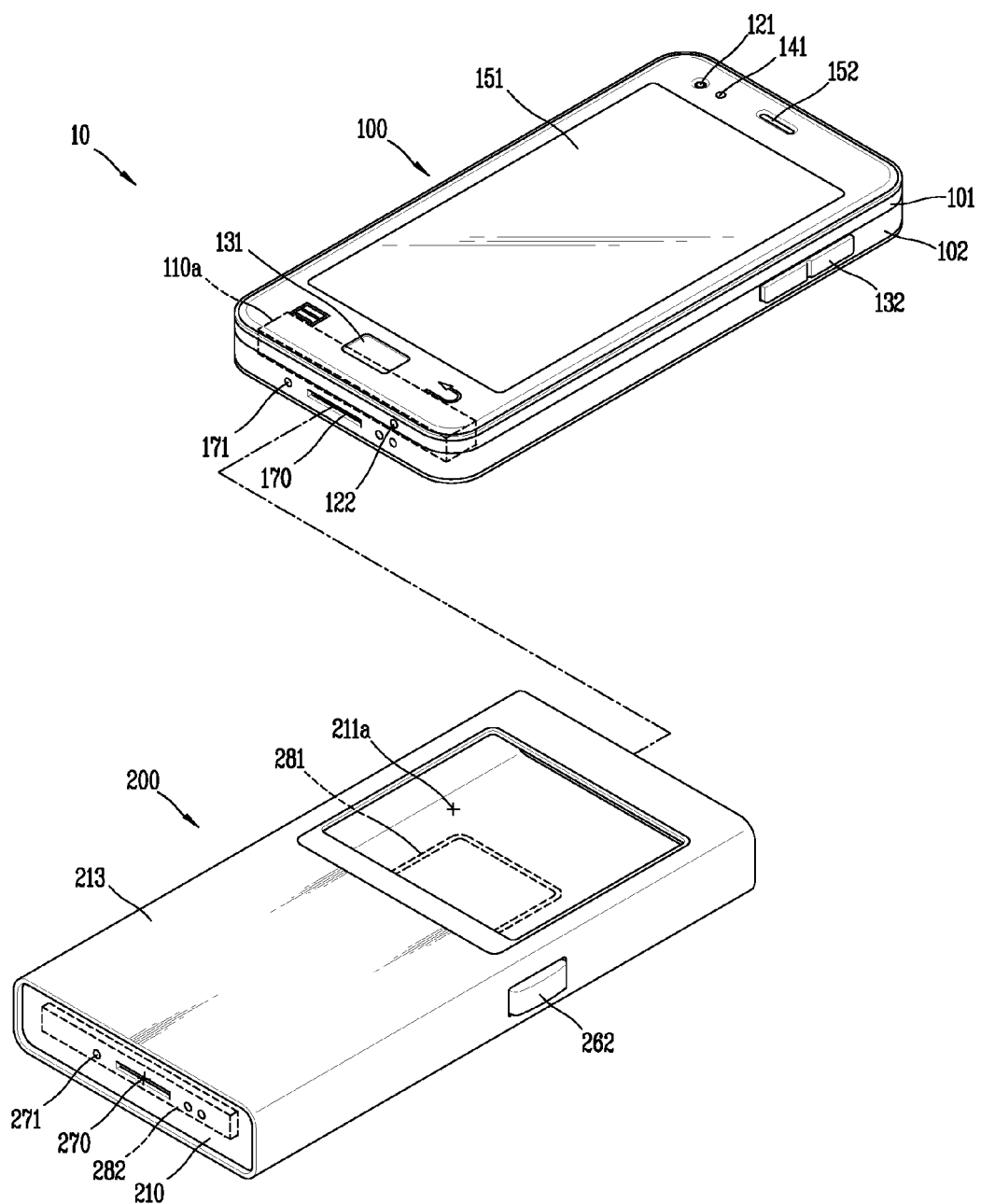
FIG. 7 is a conceptual view showing an antenna for extending a wireless communication function of the terminal body and the pouch shown in FIG. 2A.

FIG. 7 is a conceptual view showing an antenna for extending wireless communication functions of the terminal body 100 and the pouch 200 shown in FIG. 2A.

The terminal body 100 may include a main antenna 110a for transmission and reception of a wireless signal. For example, the main antenna 110a may be at least one of an antenna formed to transmit and receive a wireless signal corresponding to at least one of Personal Communication System (PCS), Advanced Wireless Service (AWS), Digital Communications Network (DCN) and Long Term Evolution (LTE), a broadcast signal receiving antenna operating at an FM radio frequency band, a short-range wireless communication antenna such as Bluetooth (BT) and Wi-Fi, and a satellite signal receiving antenna.

Sub antennas 281 and 282 for extending a wireless communication function of the terminal body 100 may be installed in the pouch 200. The sub antennas 281 and 282 may be formed as loop type antennas at a rear surface of the moving plate 211 to perform a short-range wireless communication, or be electrically connected to the main antenna 110a to improve performance of the main antenna 110a. For example, the sub antennas 281 and 282 may be implemented as a Multiple Input Multiple Output (MIMO) antenna allowing multiple input and output for increasing data transmission rate.

The sub antennas 281 and 282 may be electrically connected to the terminal body 100 via the first and second connection ports 171 and 172. Or, the sub antennas 281 and 282 may be disposed adjacent to the main antenna 110a with preset intervals so as to form coupling with the main antenna 110a.

Figure 8A:
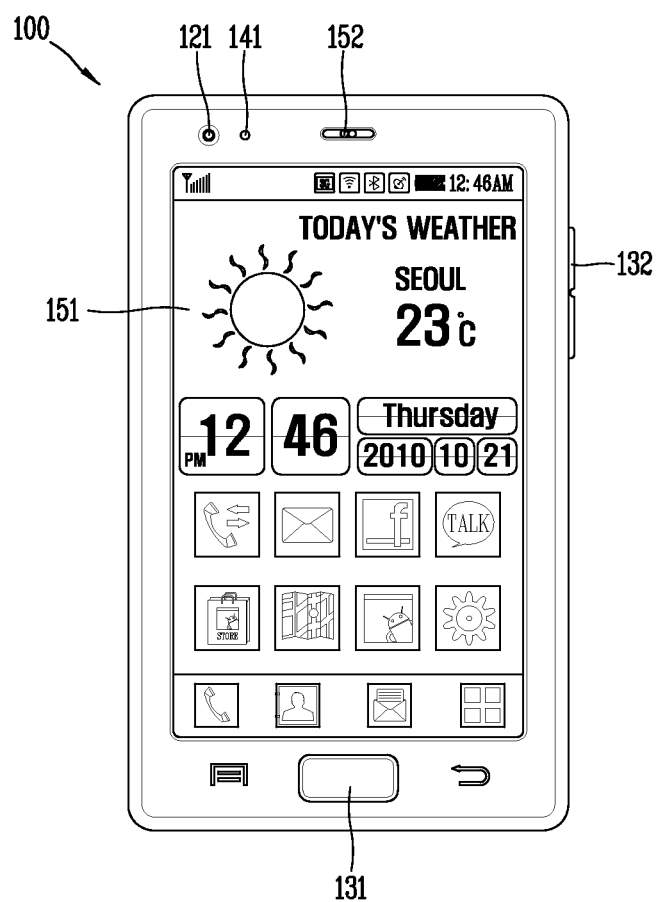
FIGS. 8 to 10 are conceptual views showing various User Interfaces (UIs) based on a received state of the terminal body in the pouch, shown in FIG. 2A.
Figure 8B:
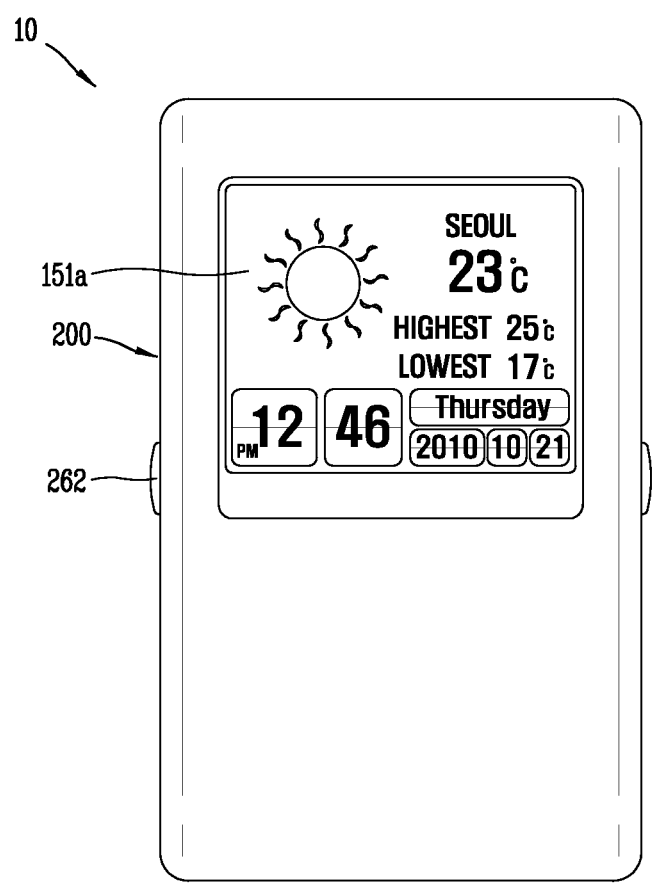
Figure 8C:
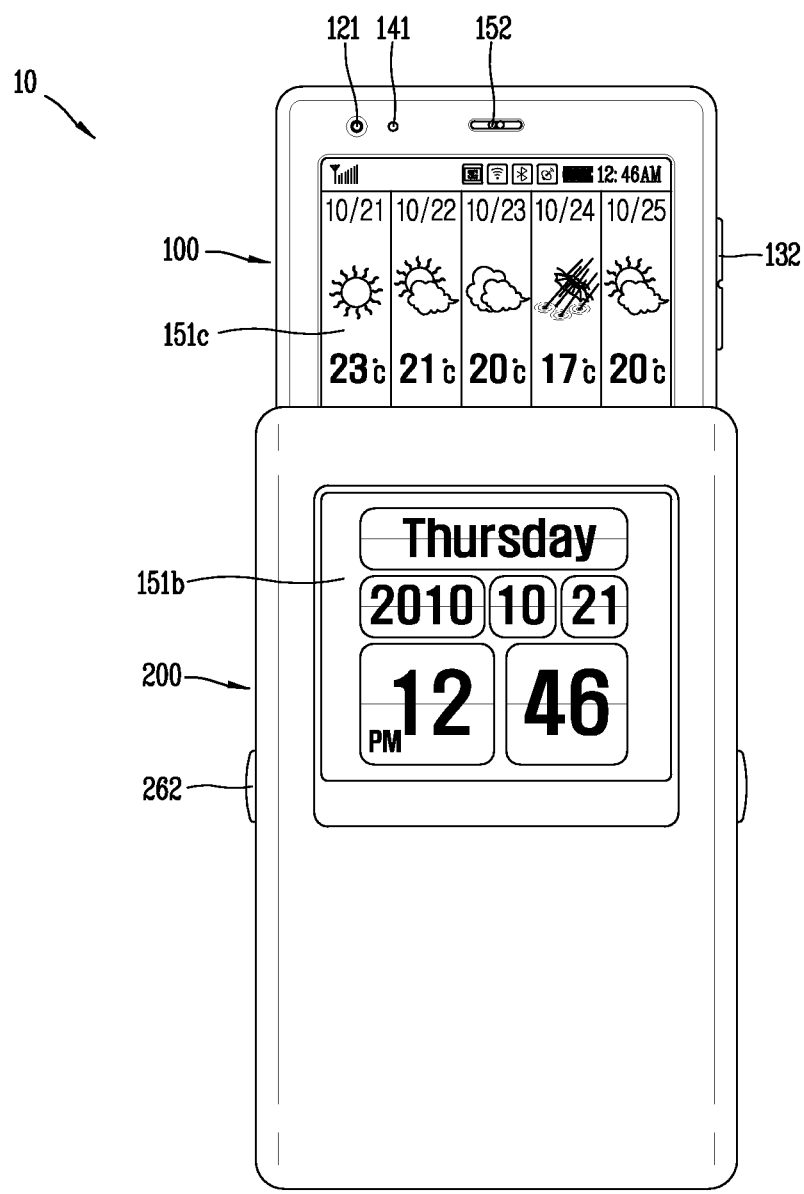
Figure 9:
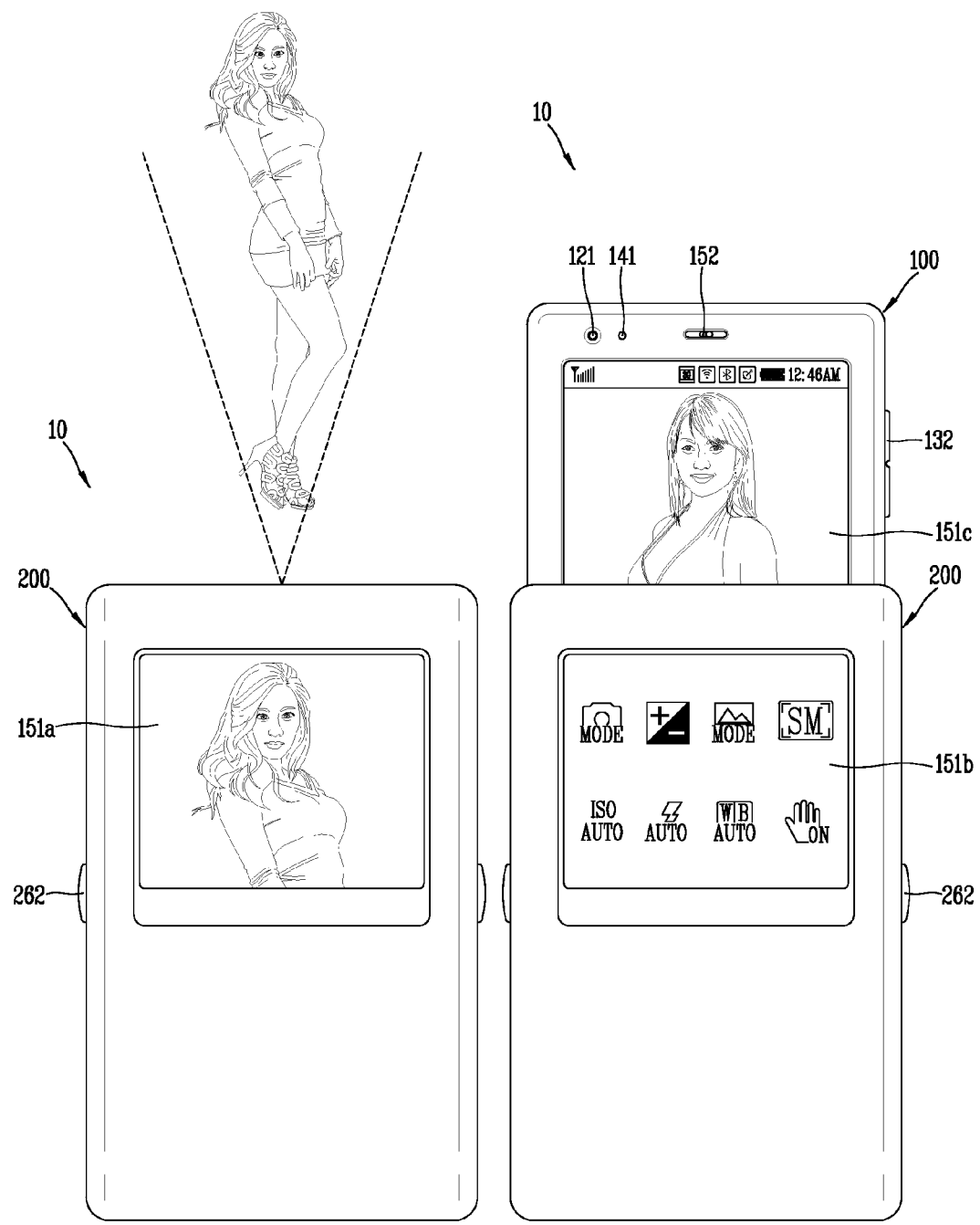
Figure 10:
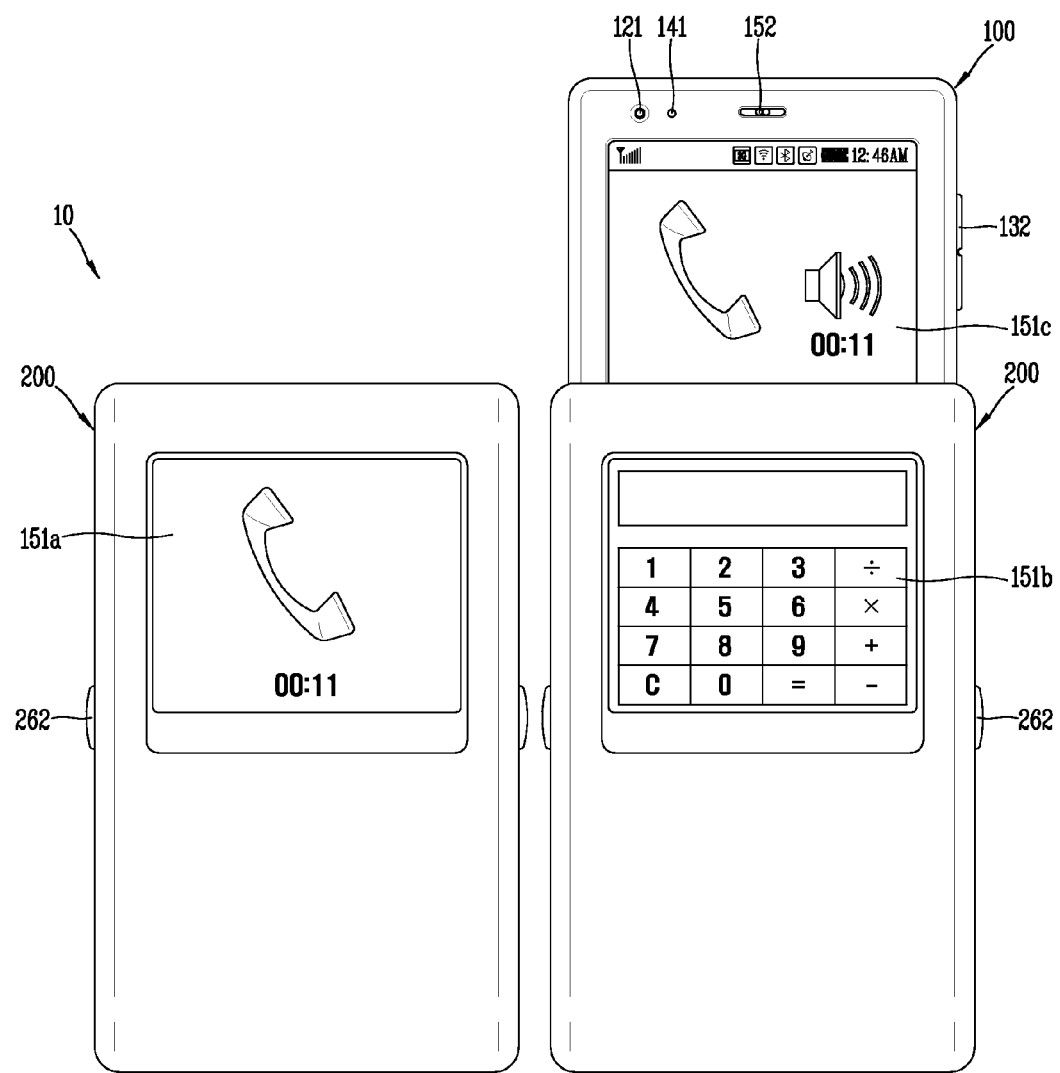

FIGS. 8 to 10 are conceptual views showing various User Interfaces (UIs) based on a received state of the terminal body shown in FIG. 2A in the pouch 200.

As shown in FIGS. 8A to 8C, when the terminal body 100 independently operates in a separated state from the pouch 200, the display unit 151 may output visual information of a first mode. The display unit 151 may output icons, such as weather, time, current weather, execution of a specific application and the like, in the first mode.

When the terminal body 100 is received in the pouch 200 and the first connection port 171 and the second connection port 271 are electrically connected to each other, visual information of a second mode may be output on a portion 151a of the display unit 151 exposed through the opening 211a. In detail, the terminal body 100 may include a proximity sensor 141 for sensing whether or not an external object is proximate. The proximity sensor 141 may be disposed to overlap the pouch 200 in the pouch state. The display unit 151 may output visual information of the pouch mode when the proximity sensor 141 senses the proximity of the external object in the second mode, and output visual information of the half pouch mode when the proximity sensor 141 has not sensed the proximity of the external object.

Referring to FIG. 8B, in the pouch state, the portion 151a exposed through the opening 211a may display brief information related to current states, such as weather, time, current weather and the like. In the half pouch state of FIG. 8C, different visual information may be output separately on a portion 151b of the display unit 151 exposed through the opening 211a of the pouch 200 and an externally exposed portion 151c. For example, the portion 151b exposed through the opening 211a may output brief information related to the current states, and the externally exposed portion 151c may output information related to specific information (e.g., weather) indicating the current state, such as a weakly weather.

Referring to FIG. 9, when the camera 121' mounted onto the rear surface of the terminal body 100 operates in the pouch state, upon conversion into the half pouch state, the camera 121 mounted onto the front surface of the terminal body 100 may operate.

Here, the portion 151b of the display unit 151 exposed through the opening 211a of the pouch 200 may output menus (sub menus) for setting brightness, zoom-in/zoom-out, white balance (WB) and the like, all associated with capturing (main menu), and the externally exposed portion 151c may display an image screen to be captured by the camera 121.

Referring to FIGS. 10A and 10B, while the terminal body 100 operates in a phone call mode using the audio output module 152 (receiver) in the pouch state, upon conversion into the half pouch state, the terminal body 100 may be set to be converted into a phone call mode using an audio output module 152' (speaker). Here, the portion 151b of the display unit 151 exposed through the opening 211a may display user setting applications, such as a memo application, a schedule application, a calculator application and the like, performing other tasks during a phone call.

According to the configuration of the present disclosure, the slide unit may support the terminal body, be relatively slidable with respect to the base through the guide unit, and be locked/unlocked at a preset position of the base through the locking unit. Therefore, the terminal body may be received in a pouch state that it is received in the base and in a half pouch state that at least part thereof is exposed.

Also, the terminal body may sense a received state in the pouch by use of a connection port, a proximity sensor and the like to perform a specific function according to each sensed state and have an extended wireless communication function through sub antennas disposed in the pouch. This may result in providing a mobile terminal having a more extended function.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A pouch for a mobile terminal, the pouch comprising:
   a base shaped to define an opening configured to receive at least a portion of the mobile terminal wherein the mobile terminal is removable from the pouch through the opening;
   a slide unit located within the base and configured to support the mobile terminal and be slidable with respect to the base along a lengthwise direction;
   an elastic unit located between the base and the slide unit and configured to apply an elastic force;
   a guide unit configured to guide sliding of the slide unit; and
   a locking unit configured to lock the slide unit in a preset position with respect to the base, wherein the locking unit comprises a push button configured to release the locking unit from the preset position.

2. The pouch of claim 1, wherein the slide unit is further configured to be slidable between a first state in which the mobile terminal is fully received in the base and a second state in which the mobile terminal is partially received in the base.

3. The pouch of claim 1, wherein the base comprises:
   a frame configured to obscure a first side surface and a second side surface of the mobile terminal; and
   a fixed plate connected to the frame and configured to obscure a rear surface of the mobile terminal.

4. The pouch of claim 1, wherein the slide unit comprises:
   a moving plate adjacent to a fixed plate of the base, the moving plate configured to be slidable with respect to the fixed plate; and
   a support plate extending from the moving plate and configured to support the mobile terminal.

5. The pouch of claim 4, wherein the guide unit comprises:
   a first guide rail formed through the fixed plate and extending in a first direction;
   a second guide rail formed through the moving plate and extending in a second direction that intersects the first direction; and
   a guide member inserted into the first and second guide rails and configured to be movable along the first and second guide rails in response to sliding movement of the slide unit.

6. The pouch of claim 5, wherein the guide member comprises:
   a body inserted into the first and second guide rails; and
   securing portions at a first end and second end of the guide member to secure the body of the guide member in the first and second guide rails.

7. The pouch of claim 5, wherein the first guide rail is angled with respect to a sliding direction of the slide unit.

8. The pouch of claim 5, wherein the locking unit comprises:

a first guide rail extending portion extending from the first guide rail at an angled direction from the first direction and configured to receive the guide member such that the slide unit is fixed into the preset position; and a manipulation portion mounted to the fixed plate and configured to press the guide member into the first guide rail in response to an external force applied to the push button.

9. The pouch of claim 8, wherein the manipulation portion is located adjacent to the first guide rail extending portion and configured to be movable to press the guide member into the first guide rail.

10. The pouch of claim 8, wherein the elastic unit comprises:

a first elastic member configured to apply an elastic force to the slide unit along the lengthwise direction; and a second elastic member configured to apply an elastic force to bias the guide member towards the angled direction such that the guide member is received in the first guide rail extending portion.

11. The pouch of claim 10, wherein the second elastic member comprises a spring having a first end fixed to the moving plate and a second end fixed to the guide member.

12. A mobile terminal comprising:

a terminal body having a display disposed on a front side of the terminal body; and a pouch configured to receive the terminal body, wherein the pouch comprises:

a base shaped to define a first opening configured to receive at least a portion of the terminal body, wherein the terminal body is removable from the pouch through the first opening;

a slide unit located within the base and configured to support the terminal body and be slidable with respect to the base along a lengthwise direction;

an elastic unit located between the base and the slide unit and configured to apply an elastic force;

a guide unit configured to guide sliding of the slide unit; and a locking unit configured to lock the slide unit in a preset position with respect to the base, wherein the locking unit comprises a push button configured to release the locking unit from the preset position, wherein the slide unit is slidable between a first state in which the terminal body is fully received in the base and a second state in which the terminal body is partially received in the base.

13. The mobile terminal of claim 12, wherein the terminal body comprises a first connection port configured to be electrically connected to a second connection port mounted on the base.

14. The mobile terminal of claim 13, wherein the display is configured to output visual information based on:

when the terminal body is in a separated state where the terminal body is separated from the pouch; and when terminal body is in a connected state where the first connection port is electrically connected to the second connection port.

15. The terminal of claim 13, wherein:

the terminal body further comprises a proximity sensor configured to sense whether the terminal body is fully received in the base or partially received in the base; and the display unit is further configured to output visual information based on whether the terminal body is fully received or partially received in the base.

16. The terminal of claim 15, wherein the display unit is further configured to:

output a main menu when the terminal body is fully received in the base; and output sub menus of the main menu when the terminal body is partially received in the base.

17. The terminal of claim 15, the terminal body further comprising a first camera disposed on the front side of the terminal body and a second camera disposed on a rear side of the terminal body, wherein the mobile terminal is configured to:

activate the first camera when the terminal body is partially received in the base; and activate the second camera when the terminal is fully received in the base.

18. The terminal of claim 15, wherein the mobile terminal is further configured to:

activate a handheld phone mode when the terminal body is fully received in the base; and activate a speakerphone mode when the terminal body is partially received in the base.

19. The terminal of claim 12, wherein:

the mobile terminal further comprises a main antenna configured to transmit and receive a wireless signal; and the pouch comprises sub antennas configured to extend a wireless communication function of the mobile terminal.

20. The terminal of claim 19, wherein the sub antennas are disposed adjacent to locations corresponding to the main antenna at preset intervals in order to form coupling with the main antenna.

* * * * *